(12) United States Patent
Toyosato et al.

(10) Patent No.: US 6,304,459 B1
(45) Date of Patent: *Oct. 16, 2001

(54) MOBILE COMPUTER

(75) Inventors: Kazuyuki Toyosato, Yokohama (JP); Michael D. Jenkins, Manassas; Edward G. Newman, Fairfax Station, both of VA (US)

(73) Assignee: Xybernaut Corp., Fairfax, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/092,261

(22) Filed: Jun. 5, 1998

Related U.S. Application Data

(63) Continuation-in-part of application No. 08/861,598, filed on May 22, 1997, now Pat. No. 5,844,824.

(51) Int. Cl.[7] ........................................................ G06F 1/16
(52) U.S. Cl. ........................... 361/861; 361/680; 361/683; 361/684; 361/685; 361/686; 361/730; 364/708.1; 364/709.02; 364/709.1; 364/710.01; 312/208.4; 345/148

(58) Field of Search ..................................... 361/680, 681, 361/683, 685, 684, 686, 730; 364/708.1, 709.02, 709.1, 710.01; 312/208.4; 345/168

(56) References Cited

U.S. PATENT DOCUMENTS 5,719,743 * 2/1998 Jenkins et al. ........................ 361/683
5,774,338 * 6/1998 Wessling, III ........................ 361/730

* cited by examiner

Primary Examiner—Leo P. Picard
Assistant Examiner—Yean-Hsi Chang
(74) Attorney, Agent, or Firm—James J. Ralabate

(57) ABSTRACT

This is a body-worn, hands-free activated computer that is constructed of materials that conduct heat and is heat insulating. The portion of the computer that is heat insulating is located closest to a wearer's body, the portion that is heat conducting is located farthest from the user's body. Heat is a major problem in wearable computers and this invention provides efficient ways for coping with heat generated by the CPU inside the computer housing. In addition to materials used in constructing the housing for this computer, a heat sink and heat-insulating logs are used to further deflect and direct heat away from a user.

32 Claims, 8 Drawing Sheets

MOBILE COMPUTER

The present application relates to a mobile computer and more specifically to a user-supported computer that can be operated in a hands-free manner. This application is a Continuation in Part application of parent application Ser. No. 08/861,598 filed in the U.S. Patent and Trademark Office May 22, 1997 now Pat. No. 5,844,824.

BACKGROUND OF THE INVENTION

It is known that various embodiments of computers may be worn and operated in a hands-free manner. A feature of these prior art computers is that they permit the user to have freedom to use his or her hands for repairing or other functions while using a fully functional computer. One of the most commercially successful and well known of these computers is the Mobile Assistant® available from Xybernaut Corporation of Fairfax, Va. Mobile Assistant® is a registered trademark of Xybemaut Corporation (formerly Computer Products & Services, Inc.).

U.S. Pat. No. 5,305,244 (Newman, et al.) describes the details of the Mobile Assistant® and fully discloses the components and function of such user-supported computers. Also, co-pending patent application Ser. No. 08/538,194 describes and claims further improvements and modifications to the Mobile Assistant®. Both U.S. Pat. No. 5,305,244 and Ser. No. 08/538,194 are owned by the assignee of the present application. Also describing wearable computers are U.S. Pat. Nos. 5,285,398 (Janik I) and 5,491,651 (Janik II). Both of these patents disclose a belt computer containing the elements or components of a computer. In Janik I the plurality of computing elements are located on the belt and a flexible signal relaying means connects all of the elements for computing. A protective covering is used for enclosing said computer elements. In Janik II a similar belt computer is described and claimed in which the signal relaying means, the length of which between any two computing elements, is greater than the length of the wearable member between any two computing elements. In both Janik I and Janik TI the flexible wearable computer is in the form of a belt comprising around its periphery sequentially positioned computer elements.

Also in the prior art, PCMCIA cards extend out from the main frame of the computer housing and are often damaged. This is quite frequently the case in mobile body-worn computers where movement of the user is frequent and sometimes extreme.

SUMMARY OF THE INVENTION

It is therefore an object of this invention to provide a computer structure devoid of the above-noted disadvantages.

A further object of this invention is to provide a novel heat sink stricture and compositions for use in a body-worn computer to disperse heat from the interior of the computer.

Another object of this invention is to provide a computer stricture having a housing containing a PC card substantially weather-proof compartment that houses substantially the entire PC card when in use.

Still a further object of this invention is to provide a computer structure having recessed or offset connector means for connection of peripherals thereto.

Yet a further object of this invention is to provide a compartment for a removable hard drive in a reversible mobile computer.

Still a further object of this invention is to provide a mobile computer that optionally has means for communicating with other means using infrared technology.

Another object of this invention is to provide a computer structure that can be used as both a mobile computer and a stand-alone or desktop computer.

A further object of this invention is to provide a computer structure that when worn can be used interchangeably on the right or left side of a user.

A still further object of this invention is to provide a mobile computer structure that can be worn on any portion of the body in a hands-free manner.

Another still further object of this invention is to provide a mobile computer having outlets or other means to connect onto or to be compatible with components of a stand alone, laptop or desktop computer.

Yet another object of this invention is to provide a computer structure that contains in a single housing substantially all of the components needed in a general purpose or conventional computer, including but not limited to, input/output means, processor means and storage means.

Other objects will become apparent upon a further reading of this disclosure.

The above objects and others are accomplished, generally speaking, by providing a mobile, body-worn computer comprising a computer housing, activating means, means for attaching said computer housing to a user, said computer housing comprising substantially all of the components of a conventional computer, said housing comprising at least one of the following:

A. an offset peripheral connector means recessed from a rear terminal portion of said computer housing;

B. a PC card housing having means to contain substantially an entire PC card when contained therein;

C. a compartment for housing a removable hard drive; and

D. an opening for internal connection to an IrDA transceiver.

A mobile body-worn computer of this invention comprises a computer housing, hands-free activation means and means for attaching the computer housing to a user. The computer housing comprises substantially all of the components of a conventional computer with a computer housing having front, back, top, bottom and side sections. The back section has means for attachment of cables and the front, back, top and side sections are constructed substantially of a heat conducting and dissipating material whereas the bottom section is constructed substantially of a heat insulating material. When this computer is worn the bottom section is located adjacent a user's body. The problems faced with mobile, body-worn computers are completely different than those of stationary or laptop computers. Most importantly, substantial heat is generated by the CPU and, while this is not a significant problem in stationary or laptop computers, it becomes a major problem in body-worn computers since the computer is worn next to the user's body. Some attempts to remedy this problem in body-worn computers is to highly insulate the components and or the computer housing but these efforts result in a larger and heavier computer. Since size and weight are also significant factors in body-worn computers, these prior art efforts have not solved the problem and, for that matter, created problems of size and weight.

This computer structure is usable as a safe, mobile body-worn computer and also as a component for a stand-alone, laptop or desktop computer or any other conventional computer. By "conventional computer" is meant any computer known and used today such as those available from IBM, Dell, Apple, Compaq, Toshiba, Micron, Hewlett-Packard, etc. The computer structure of this invention in one embodiment has a computer housing that can be worn around the waist of a user and is slightly curved on its bottom or inner side (the side that contacts the user's waist) to be contoured in accordance with the curvature of the user's body. It has structural dimensions or area that occupies only a relatively small portion of said user's waistline. Thus, unlike Janik I and II above discussed, does not encircle the entire waist of the user. When used as a waist-worn computer, it is important it be heat insulated and that cables and other electrical connections extend from the back portion of the computer so as to be out of the way and not interfere with the user's hands when he or she is attempting to repair an object or machine or otherwise use their hands. The computer structure is symmetrical; therefore, the computer can be turned upside down as a unit for left-hand operation. The cable outlets in this manner always will face the back of the user. Conversely, the mouse controls (when converted to a conventional computer) and not used as a hands-free, voice-activated computer, will always be positioned in the front of the computer housing convenient for the right or left-hand user. The housing of the computer of this invention has outlets for connection to other components such as power supplies, monitors, keyboards, or any other required component. All embodiments of a mobile computer described in co-pending application Ser. No. 08/861,598 and in U.S. Pat. No. 5,305,244 are included in those structures usable in the present invention with the modification described and claimed herein. The disclosure of Ser. No. 08/861,598 is incorporated by reference into the present disclosure.

The embodiment of this invention that includes voice activation when the computer is body-worn also includes a body-worn display screen such as a head-won (or arm-worn display) or the display can be a flip up or other monitor located on the computer housing. The computer housing in the present invention includes all of the components found in a conventional computer such as a storage means, processor means, audio transducer and converter means and recognizing means, all of which are described in detail in U.S. Pat. No. 5,305,244. Also included in this embodiment are means for mounting the computer housing onto a user. Generally, attachment is made on a belt worn by a user such as around the waist, over the shoulder or onto a vest torso. Preferably in a front terminal portion of the computer housing extending outwardly is a heat sink comprising ribbed or louvered sections to permit heat to be dissipated from the interior of the housing and to allow a proper internal temperature best suited for computer operation. Also, it is imperative that this body-worn computer be maintained at temperatures safe and suitable to be worn for extended periods of time. The computer housing bottom section generally is made of a lightweight yet rigid plastic or other suitable non-heat conducting material. In the present invention, a substantial or major portion of the top and side sections of the housing are constructed of a heat dissipating material which transmits or conducts the heat from the internal portion of the housing away from the user and to the atmosphere. These top and side outer sections (away from the body of the user), together with the above-noted heat sink located in a front raised portion, efficiently dissipates heat from the internal portion of the housing and safe for the user. The housing is contoured or somewhat curved to follow the curvature of the human body such as the torso or waistline. The portion of the computer housing that contacts the user's body has rubber feet or other insulating material that doubles as a belt loop anchor (when used as a body-worn computer). The front underside of the housing will, as mentioned in the preferred embodiment, also have loops attached to the legs through which a belt will fit when attaching to a user. The conduits or connection means which are preferably located in the rear side of the housing are used for cable connection to power means, peripherals, and the body or head-mounted display or conventional monitor. The display used in the present invention can be any type monitor such as head-mounted display, flat panel monitor, wrist or hand-mounted monitor or any other suitable display or monitor.

When the structure of this invention is used as a conventional computer, there are located on the top section of the housing three movable levers, joy sticks or buttons or other means; one to operate a mouse and the other two for program execution or cursor manipulation. When the mobile function is desired, the top, movable button or lever will always be used in the same manner whether worn on the right or left-hand side of the user.

The specific configuration of the presently defined wearable computer provides several improvements over the Newman et al U.S. Pat. No. 5,305,244 and other known mobile computers. As above noted, a unique problem encountered with wearable computers that is not a problem with stand-alone conventional desk computers, is that heat generated by the CPU could harm the computer or the wearer because of the proximity of the wearer and computer. Many attempts have been made to alleviate this problem, but none have been totally satisfactory. In the present invention the upper or top portion of the computer (the part away from the users body) and sides are constructed of a heat conducting material such as magnesium, aluminum, copper, steel or other suitable known heat conducting materials. This material conducts heat from the interior of the housing and away from the user to the atmosphere. In addition, a heat sink made up of several louvers or ribs is positioned on an extended projecting front section of the housing, thereby diverting the heat away from the user's body. Since the heat generated by the CPU chip is substantial, especially in a body-worn computer, it is extremely important for any successful wearable product to effectively minimize this problem. In the present invention, all sides of the computer housing except the bottom utilize effective heat sinks; the front, top portion and side portions have heat sinks in the form of heat conducting materials, and the bottom portion (closest the wearer) is constructed of a substantially non-heat conducting material such as some plastics such as ABS resin, FRP resin, rubber, wood, silk, Styrofoam, fiberglass or any other suitable heat insulating material. It is critical to this invention that the portion of the housing closest the wearer be constructed of a material that will not transmit heat or will minimize the transmission of heat; some of these materials are, as noted, plastics or fiberglass. The extended front section of the housing made up of a heat sink with a plurality of ribs or louvers will also direct heat away from the user's body and assist in maintaining the heat generated to a very tolerable level for the user. This feature of efficient heat dissipation is not present or known in any of the prior art wearable computers. It is important to this invention that this heat sink be constructed so that it acts as an air scoop as the wearer walks forward. The air flow into the heat sink is best accomplished if the heat sink is located in the front of the housing for maximum air intake. Obviously, it cannot be located at the bottom section of the housing since this is the part abutting the wearer's body and little or no air intake is possible.

In addition to the heat dissipation features above discussed, projecting rubber legs (or other non-conducting materials) are positioned in the bottom portion of the housing so that these heat insulating legs rather than the housing contact the user. These legs put an insulating air space between the user and the housing to further reduce the heat problem. These legs also double in function as the loop holders that allow the user to place his other belt through the loops provided. This feature and the above features will be further described in relation to the drawings.

DETAILED DESCRIPTION OF THE DRAWING AND PREFERRED EMBODIMENTS

Figure 1:
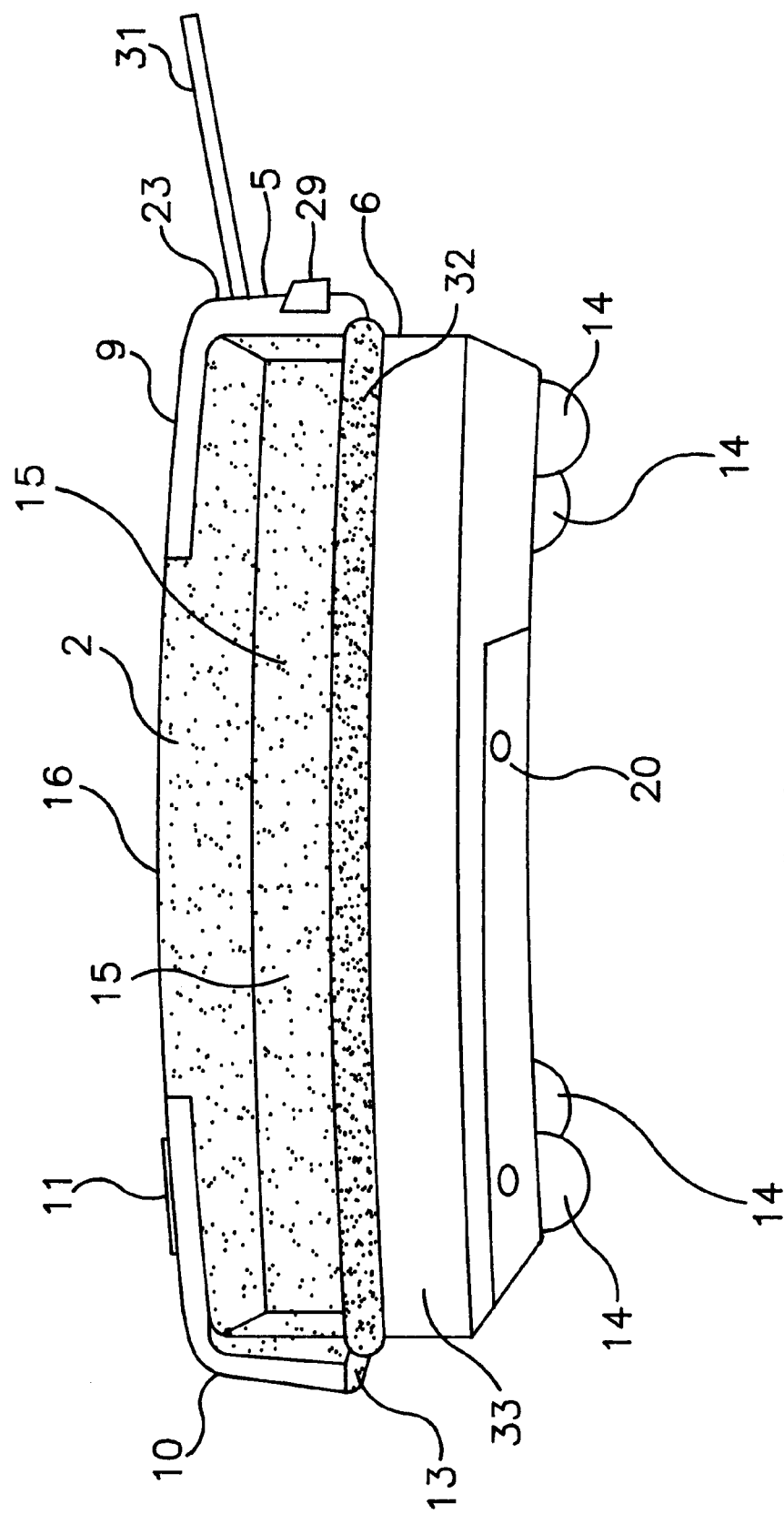
FIG. 1 is a side plan view of the wearable computer of this invention with the PCMCIA housing door closed.

In FIG. 1 a computer 1 is shown from a side view. The computer 1 has a housing 2 having a back section 5, a top front portion or section 10, a top section 16 and a bottom portion or section 20 of housing 2. The bottom section 20 is closest to the wearer's body when in use separated, however, by the legs 14 which are insulating and provide a further insulating air space between the housing bottom 20 and the user. The legs 14 actually touch the user's waist or torso and provide good insulation for the user in both heat and electrical insulation. An extending front section 13 provides a heat sink 13 for assisting the dissipation of heat from the interior or housing 2 to the atmosphere. Note that this heat sink 13 is also configured to direct heat away from a user's body when worn. The top 16 and upper sides 15 and 17 (bottom sides near or adjacent bottom 20 are heat insulating) are constructed of a heat conducting material or heat sink material to further direct heat away from the user. A rubber separator 32 is located between heat conducting sides 15 and 17 and bottom insulating sides 33 and 34. This further diverts heat from the user. The bottom section 20 is constructed of an efficient heat insulating material to avoid significant heat next to the user. Further, legs 14 are made of a reliable heat insulator such as rubber or plastic since they will contact the user when worn. When not worn, legs 14 act as the stand or support for housing 2 when the computer is in use but not worn or used as a conventional stand alone computer.

Figure 2:
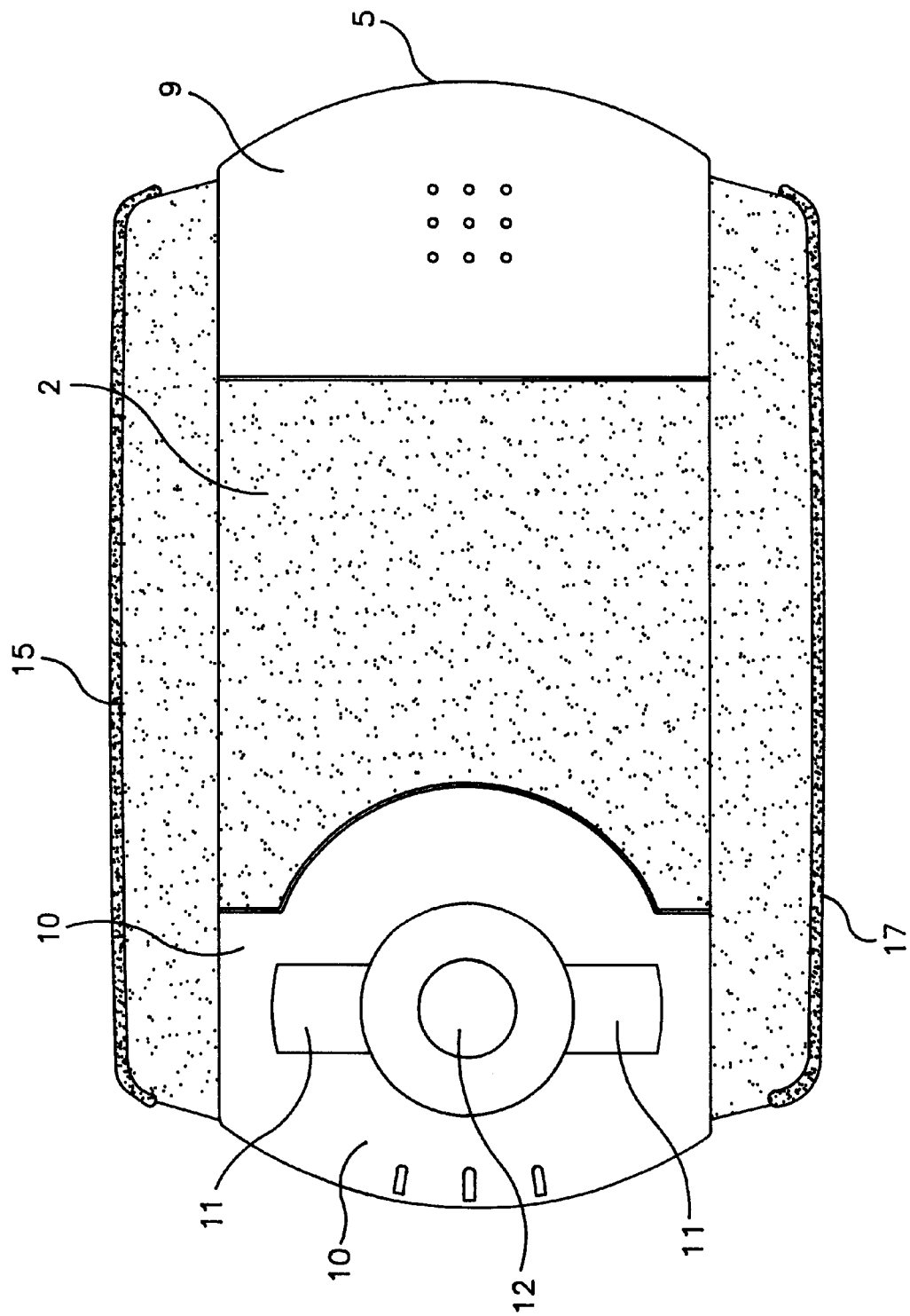
FIG. 2 is a top plan view of the wearable computer of this invention with the PCMCIA housing door closed.
Figure 3:
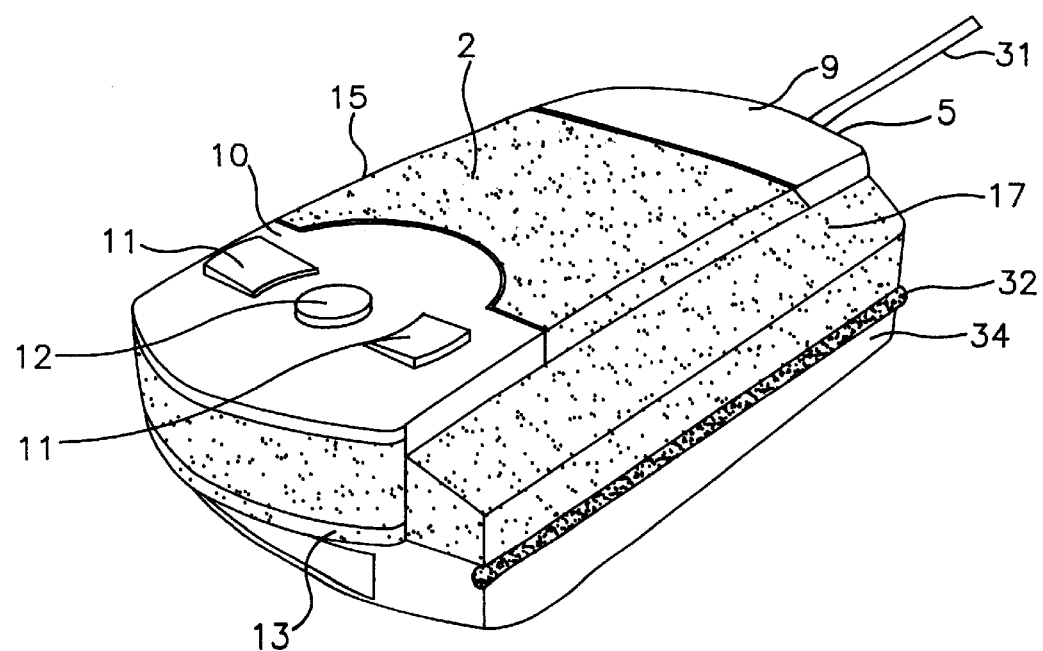
FIG. 3 is a side perspective view of the wearable hands-free computer of this invention with the PCMCIA housing door closed.
Figure 7:
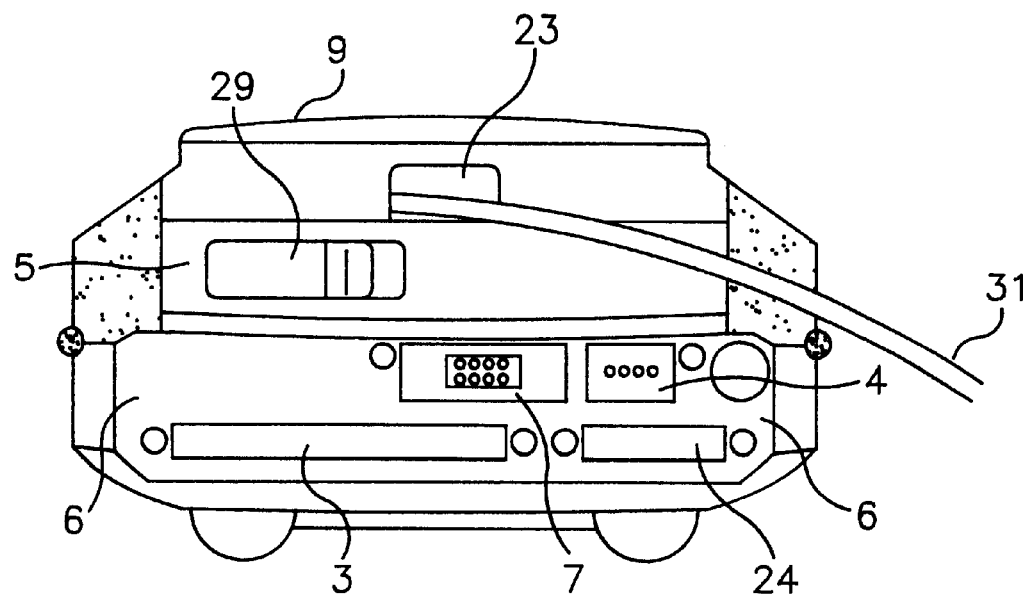
FIG. 7 is a back plan view of the hands-free wearable mobile computer of this invention.

Toward the back section 5 on the top is located a PCMCIA compartment door 9 which is made of a non-heat conducting material and having a slot 23 through which an enclosed PCMCIA card cable 31 extends. In FIGS. 2 and 3 top front 10 of the computer is illustrated wherein control buttons 11 are easily accessible to both right and left-handed users. It is critical to this invention that the area around central buttons 11 and control lever 12 be constructed of a heat-insulating material. In addition, it is critical to the present invention that door 9 also be constructed of a heat-insulating material. Since the user will touch door 9 and the area surrounding buttons 11 and control lever 12, it is important that these sections of the top of housing 2 be constructed of a heat-insulating material. When the computer housing 2 is turned upside down in changing from right-hand to left-hand use, the controls of buttons 11 and mouse lever 12 always face the front of the user for easy access and use. Conversely, when right side 15 is facing up or down when worn, the controls 11 and 12 always face the front and outlets 3 and their cables always face the back of the user out of his or her way. Controls or software can be provided to convert or reverse the functions of controls or buttons 11. Versa Point® mouse pointing technology may be used as one suitable means in controls 11 and 12. Versa Point® is a trademark of Interlink Electronics of 547 Flynn Rd., Carnarillo, Calif. 93012. Opening 25 is optionally used as an IrDA port that can be used for wireless communications (see FIG. 8). IrDA (Infrared Data Association) ports are known for example as disclosed in U.S. Pat. No. 5,491,651 patent and other publications. IrDA are used as transceivers (transmit and receive) to communicate with local area networks, with printers, with another computer for transferring of information or data and other desired uses. In the present invention, opening of port 25 is used for optional access to an IrDA connection. In FIGS. 1 and 7, a side and back view of the computer 1 is shown. The positioning of offset or recessed bottom extension 6 is shown slightly indented and below back portion 5 of the computer housing 2. The bottom 20 of housing 2 which is adjacent to the user's body is shown. While the figures all show (for clarity purposes only) a rectangular configuration for housing 2, other shapes or configurations may be used if desirable. For example, an oval or circular configuration may be used if the other specifics of this invention as claimed are present. Openings 3 and 4 in FIG. 7 provide means for connecting to computer 1 other peripheral equipment as floppy drives, bar code scanners, VGA port or external monitor connectors. Any suitable number of outlets may be used and are all positioned in bottom extension 6. FIG. 7 clearly shows the location of these electrical outlets or conduits 3, 4, 7 and 24. Opening or slot 23 is a cable opening for cables used with PCMCIA card slots.

Figure 4:
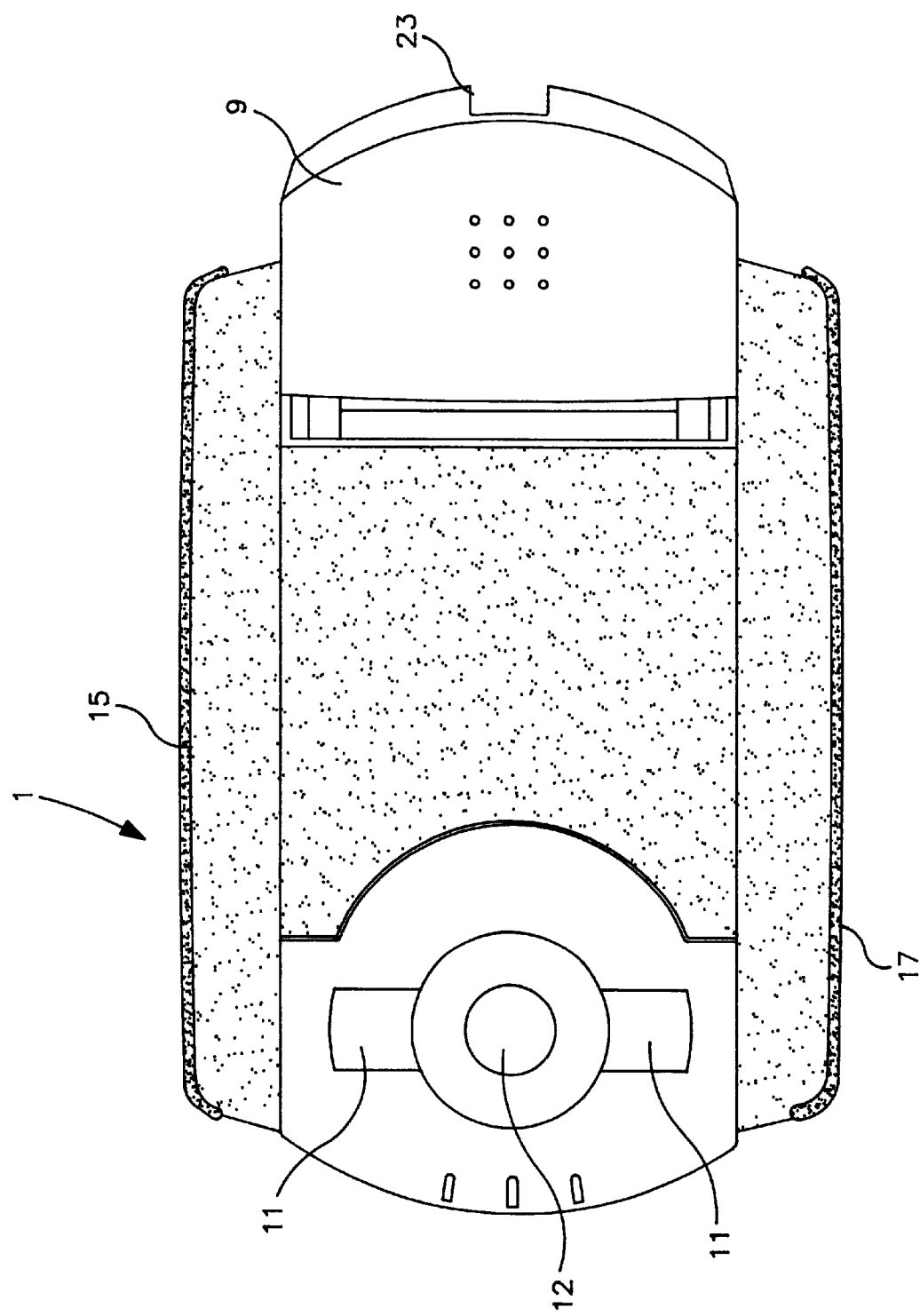
FIG. 4 is a top plan view of the wearable mobile computer of this invention with the PCMCIA housing door opened.

In FIGS. 3 and 4 the computer 1 is shown, in FIG. 3 with the PCMCIA compartment door 9 closed and in FIG. 4 with the door 9 open. When the PCMCIA card is enclosed in compartment 26, the door can be closed as shown in FIGS. 3 and 7. Cable 31 from the PCMCIA card extends through closed door 9 via door slot 23.

Figure 5:
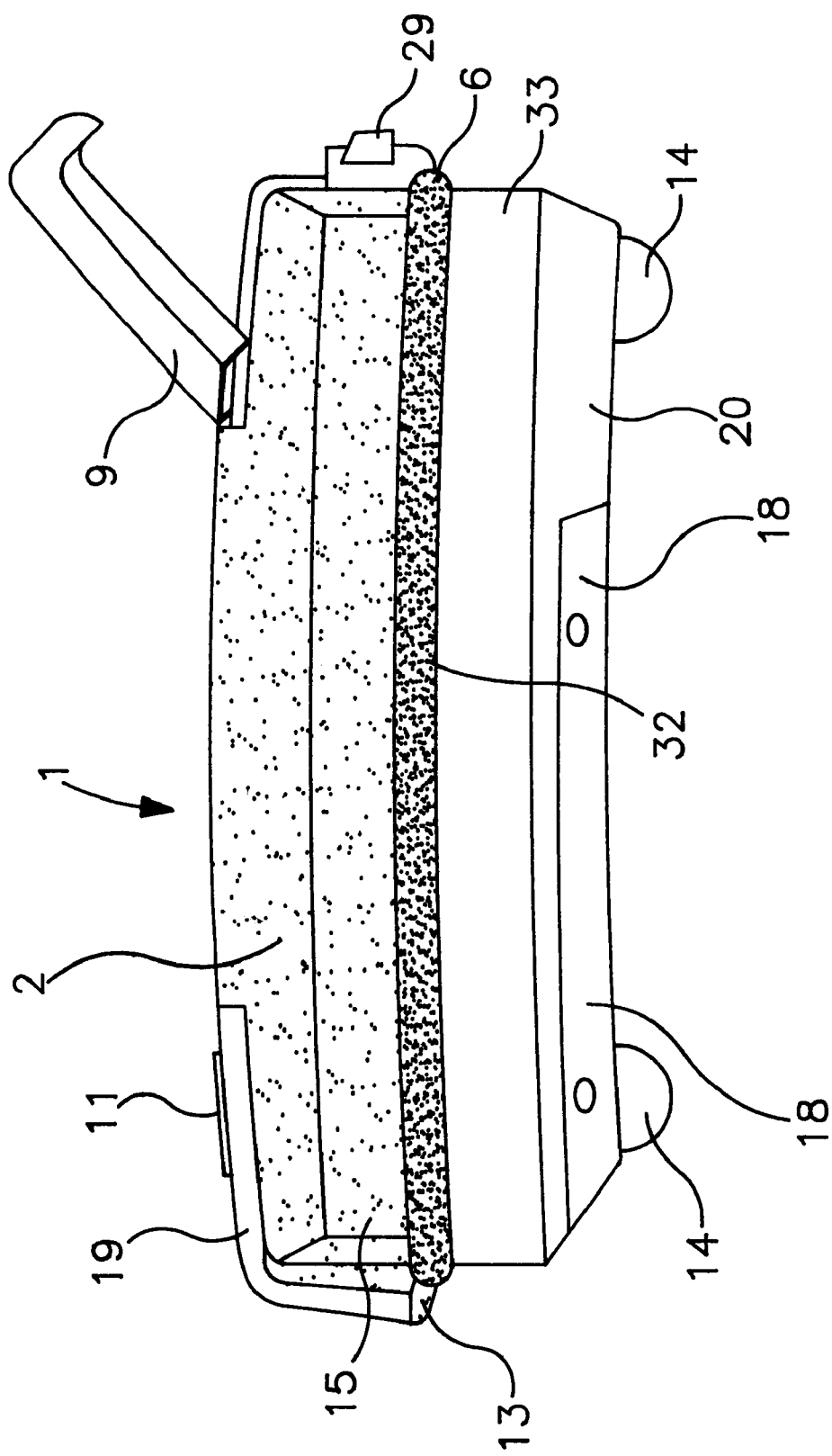
FIG. 5 is a side plan view of the user supported computer of this invention with the PCMCIA housing door opened.

In FIG. 5 computer 1 is shown from a side view with PCMCIA compartment door 9 opened. An extending front section provides a heat sink 13 to assist in the dissipation of heat from the interior of housing 2. This heat sink 13, together with the portions of housing 2 that are made from magnesium, provide an efficient way for heat generated (by the CPU in housing 2) to be easily dissipated and directed away from the wearer. As noted earlier, substantially all of housing 2 is made of magnesium (or other suitable heat disperser) except for bottom door 18, bottom portion 20, door 9, area 19 surrounding controls 11 and 12 and PCMCIA compartment enclosure 28. Wheels 14 are also made from a poor heat conducting material such as plastic, rubber or any other suitable material. Since only the legs 14 will contact the user's body, and there will be an insulating air space between bottom 18 and 20 (which are also poor heat conductors), most of the heat generated will be directed away from the user. This is a unique problem not faced with any other computers other than wearables. This invention provides at least three safeguards against this defined heat problem:

(1) heat sink 13;

(2) housing constructed at the top and sides of a heat conductor material;

(3) housing constructed at the bottom (close to user) of a poor heat conductor material.

Wheels 14 shown in FIG. 5 also hold the belt loops 21 in place. These loops 21 provide the means through which the wearer's belt will fit when wearing computer 1. These loops 21 are clearly illustrated in FIG. 6 as they are positioned on the bottom section 20 and door 18 of housing 2. The bottom section 20 and door 18 are constructed as mentioned earlier of an efficient heat insulator. Heat sink 13 made up of ribs or foils or louvers extends out from the top front portion 10 of housing 2. Door 18 is removable by loosening screws 22 when a new disk is intended to be used in the computer 1. Also, door 18 could provide access to the interior of housing 2.

Figure 8:
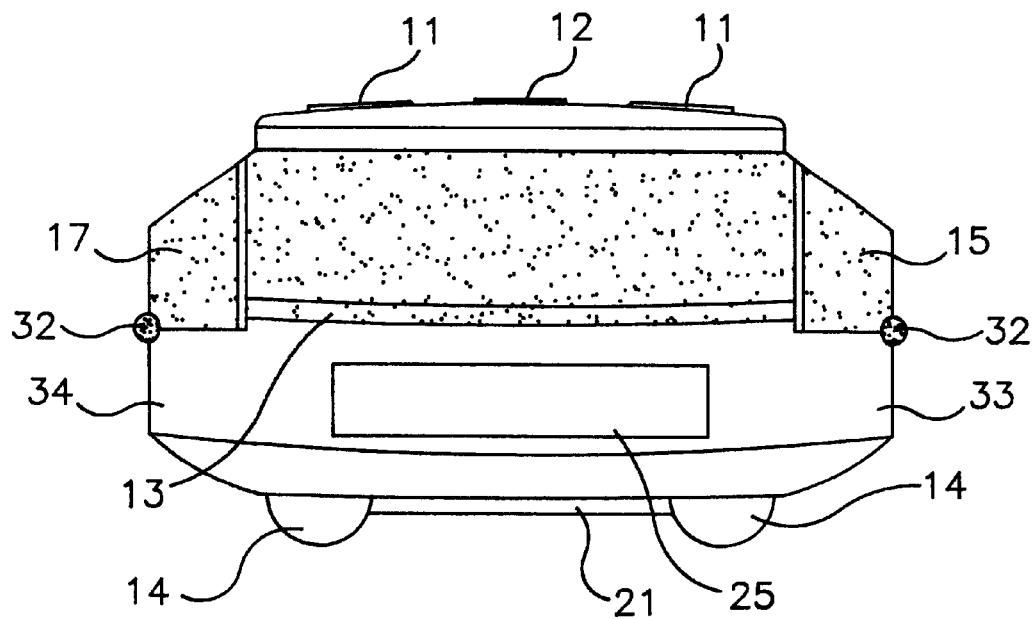
FIG. 8 is a front plan view of the hands-free wearable mobile computer of this invention.

In FIG. 7, a back plan view of computer 1 is illustrated. PCMCIA compartment door 9 is closed housing a PCMCIA card and having cable 31 extending through slot 23. Lock switch or button 29 is shown in the closed mode, to open door 9 button 29 is slid or moved to the right. Port replicator 3 is provided for docking functions. It includes means for a serial port, a parallel port, VGA port and floppy port. The power connector 7 is shown above the port replicator 3 but each of the connections shown can be located anywhere in the back section 5. A Universal Serial BUS (USB) 4 is provided for connections to peripheral devices preferably directly to the internal BUS of computer 1. Slot opening 24 is provided for connection to a head-mounted display, or flat panel display, or wrist or body-mounted display or any other display or monitor to be used with the system. In FIG. 8 the front section of computer 1 is shown with a location 25 where an optional IrDA connection 25 could be positioned if an IrDA is desired.

Figure 6:
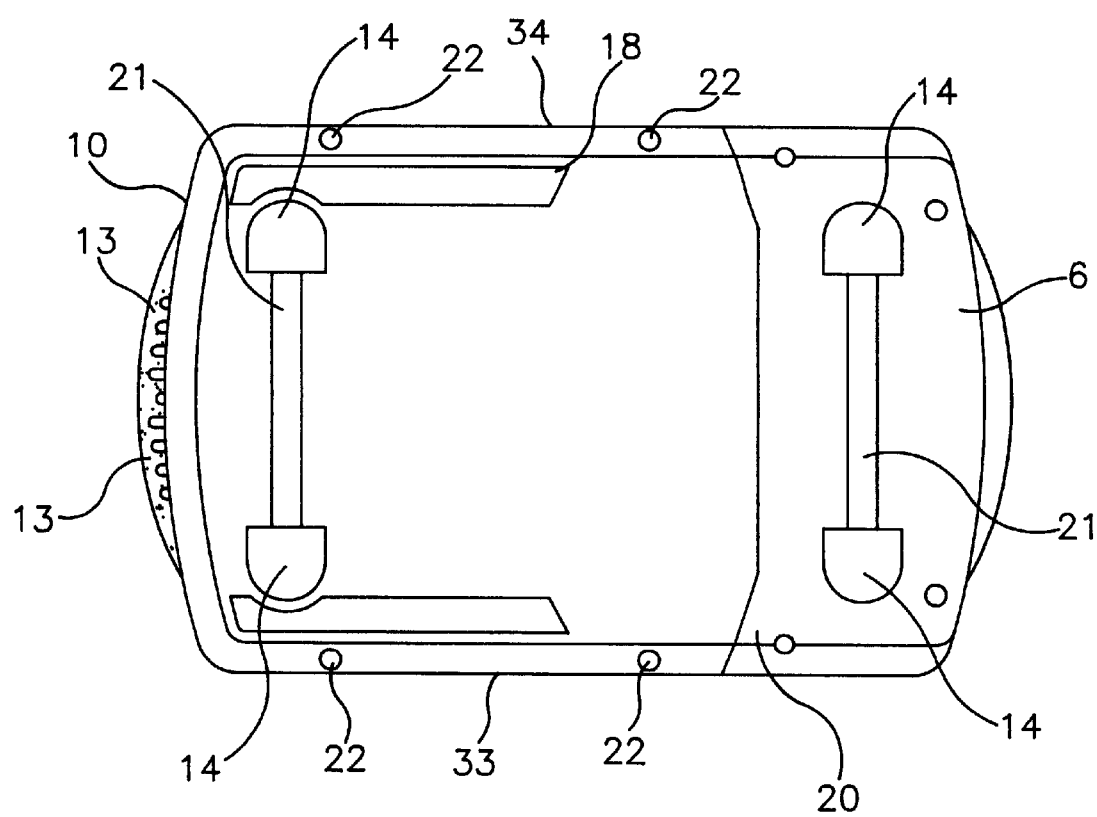
FIG. 6 is a bottom plan view of the wearable mobile computer of this invention.
Figure 9:
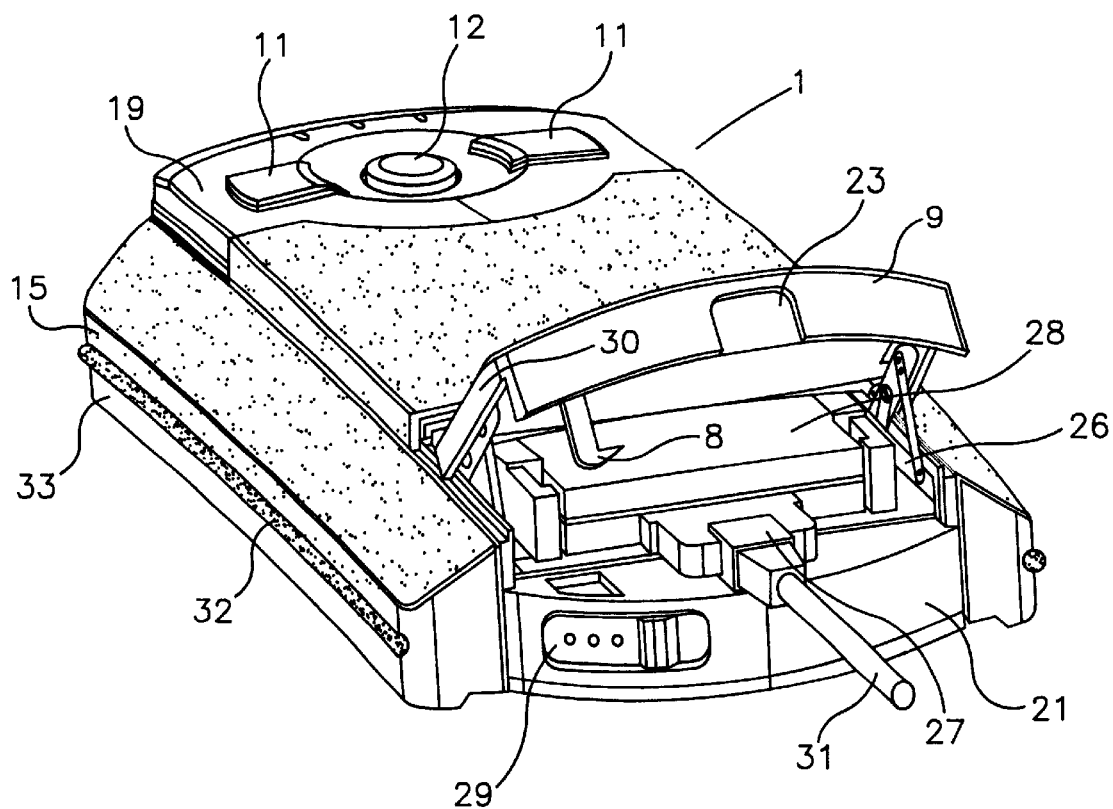
FIG. 9 is a side perspective view of the user supported computer of this invention with the PCMCIA housing door opened.

In FIG. 9 the mobile body-worn computer 1 of this invention is shown. In this figure, a lift door 9 is shown which opens into a PC card compartment 26. When the PC card 28 is housed in compartment 26 and door 9 is closed, the cable 31 connecting from the housed PC card 28 is extended through slot 23. In one embodiment of this invention, the door 9 when open exposes a connection for at least one PCMCIA card(s) (PC cards) 28. This complete housing of the card is an improvement of importance since extending PCMCIA cards (PC cards) can easily be broken or damaged thus rendering the computer capability provided by the PCMCIA card non-functional. The PC cards are housed totally within the housing 26 and only the cable or connector or dongle 27 extends out from the housing 26 and door 9 through slot 23. Also, the housing 26 permits sealing 30 around the door to make it weatherproof when worn outdoors. This internal housing 26 now provides means to prevent damaging the PC card 28 and means to weatherproof the card 28 and housing 26 from rain, water, snow or other inclement conditions. Ejecting means on button 29 are now easier to get to than the prior art buttons which are recessed and are hard to access. In addition, the pressure points on the PC card 28 are reduced in the present embodiment to further minimize damage to the card 28. Resilient waterproofing seal 30 is used to weatherproof the door and, as noted, protect the interior on housing 26 and card 28 from damage resulting from weather conditions. In FIG. 7 cable 31 which is connected to card 28 within housing 26 is shown after door 9 is closed to hermetically seal in card 28. In FIGS. 2, 3, 4 and 9, on the top front portion 10 of the computer housing 2 are central buttons 11 and joy stick or lever 12. The lever 12 is used to move and control a mouse pointer when the computer 1 is used either as a mobile or conventional computer. The control buttons 11 are used for program execution or menu selection. As earlier described, on the front section of the computer 1 is located a heat vent with vent louvers (or a heat sink) 13 which allow the heat from inside the computer housing 2 to be dissipated or vented out to the atmosphere. These ribbed vents or louvers 13 help reduce the inside heat which heat could cause malfunctioning or slowing down of the computer functions. The computer housing 2 is symmetrical so that when it is worn on either the right-hand side or left-hand side of the user's waist, the back section 5, peripheral connector means 3 and 4 will always face the back of the user. When the computer 1 is used or converted into a conventional computer and placed on a flat desk or other surface, stationary legs 14 are used to support the computer. These legs 14 are also used as a support for belt loops as shown in FIGS. 5, 6 and 7. When computer 1 is used or converted to a conventional computer, cables 4 can connect to components of a conventional computer such as monitors, keyboards, power supplies or any other desirable component. The legs 14 permit easy access to peripheral conduits and allow the computer 1 to be used on a flat surface as is customary when using a conventional or laptop computer. The louvered ribs or vents 13 allow heat dissipation also in this mode of use.

The monitor used with the computer 1 discussed herein can be any suitable display or monitor such as the preferred body or head-mounted display shown or discussed in U.S. Pat. Nos. 5,305,244; D390,552; 5,719,743 or 5,757,339. Other suitable displays may also be used if desired apart from or integral with housing 2. The preferred activation means are voice activation as disclosed in U.S. Pat. No. 5,305,244. The highly preferred single computer housing of this invention includes all of the components found in a conventional computer such as a storage means, processor means, audio transducer and converter means and recognition means, all of which are described in detail in U.S. Pat. No. 5,305,244. The housing 2 can be worn around the waist, over the shoulder or torso or worn in a vest if desired. Multiple housing can be used if suitable provided all other aspects of the defined claims are present. All of the cables must extend from the back 5 of computer 1 so that they do not interfere with the hand movements or activities of the user when body worn. Activation means disclosed in copending U.S. application Ser. No. 08/861,598 may be used with the structure or system of the present invention.

The drawings clearly show the housing 2 having shaded areas or portions and non-shaded (or white) areas or portions. Except for rubber separator 32 (or other materials) which is heat insulating, the shaded areas are constructed of any suitable heat-conducting materials. The non-shaded areas and separator 32 of all figures are constructed of heat-insulating material or materials.

The preferred and optimally preferred embodiments of the present invention have been described herein and shown in the accompanying drawings to illustrate the underlying principles of the invention but it is to be understood that numerous modifications and ramifications may be made without departing from the spirit and scope of this invention.

What is claimed is:

1. A mobile body-worn computer comprising a rigid computer housing, hands-free activation means, means for attaching said computer housing to a user, said rigid computer housing comprising substantially all of the components of a conventional computer, said computer housing having front, back, top, bottom and side sections, said back section having means for attachment of electrical connections thereto, at least a portion of said front, back, top and side sections constructed substantially of a heat conducting and dissipating material whereas substantially all of said bottom section is constricted of a heat insulating material, only said insulating bottom section is located adjacent a user's body when said computer is worn, said rigid housing when not worn having means to be used as a stand alone computer when placed on a flat surface.

2. The computer of claim 1 wherein said side sections comprise top side sections and bottom side sections, said top side sections constructed of a heat-conducting material and said bottom side sections constructed of a heat-insulating material.

3. The computer of claim 1 wherein said top section comprises a door opening into a PCMCIA compartment, said door constructed of a heat-insulating material.

4. The computer of claim 1 wherein said top section comprises an area surrounding control means, said area and control means constructed of a heat-insulating material.

5. The computer of claim 1 wherein said front and back sections comprise respectively a top front section and a bottom front section and a top back section and a bottom back section, the top sections of the front and back sections being constructed of a heat-conducting material, and the bottom sections of the front and back sections being constructed of a heat-insulating material.

6. The computer of claim 1 wherein a heat sink is located in any suitable location on said computer housing except for said bottom section, said heat sink having means to conduct and dissipate heat from an internal portion of said housing to the atmosphere.

7. The computer of claim 1 wherein said computer housing has insulating legs attached to the bottom section, said legs being constructed of a heat-insulating material and when said computer is worn providing an airspace between said bottom section and said user's body.

8. The computer of claim 1 wherein at least one of the following means is used to dissipate heat from an internal portion of said housing:
   a. a heat sink in said housing;
   b. at least portions of said housing constructed of heat-conducting and heat-insulating materials; or
   c. housing legs constructed of heat-insulating materials.

9. The computer of claim 1 wherein said housing comprises an offset peripheral connector recessed from a rear terminal portion or back section of said computer housing, said offset peripheral connectors are adjacent to and recessed back from said back section in such a manner that a rigid connector connected thereto does not extend substantially beyond said back section, said peripheral connector means having a configuration that substantially conforms to the curvature of a user's body.

10. The computer of claim 1 wherein said housing comprises a PC card housing having means to contain substantially an entire PC card when contained therein.

11. The computer of claim 1 wherein said housing comprises a compartment for housing a removable hard drive.

12. The computer of claim 1 wherein said housing comprises an opening in said front section of said computer housing for internal connection to an IrDA transceiver.

13. The computer of claim 1 wherein said top section of said housing comprises mouse control means.

14. The computer of claim 1 wherein said computer has connecting means to a power supply, a keyboard or a monitor.

15. The computer of claim 1 wherein said hands-free activation means is selected from the group consisting of audio activation means, eye-tracking activation means, electroencephalography activation means, head and arm-tracking means and mixtures thereof.

16. A mobile body-worn computer comprising a rigid single computer housing, hands-free activation means, means for attaching said computer housing to a user and communication means, said rigid computer housing comprising a single compartment that houses substantially all of the components of a conventional computer, said rigid housing containing front, back, top, bottom and side sections, at least a major portion of said front, back, top and side sections constructed of a highly heat-conducting material and at least a major portion of said bottom section constructed of a substantially heat-insulated material, said side sections comprising top side sections and bottom side sections, said bottom section having means for connection to a user's body wherein said bottom section when said computer is worn is in spaced relationship to said user's body, said side sections comprising a heat-insulating separator positioned between said top side sections and said bottom side sections.

17. The computer of claim 16 wherein said side sections comprise top side sections and bottom side sections, said top side sections constructed of a heat-conducting material and said bottom side sections constructed of a heat-insulating material.

18. The computer of claim 16 wherein said top section comprises a door opening into a PCMCIA compartment, said door constructed of a heat-insulating material.

19. The computer of claim 16 wherein said top section comprises an area surrounding control means, said area and control means constructed of a heat-insulating material.

20. The computer of claim 16 wherein said front and back sections comprise respectively a top front section and a bottom front section and a top back section and a bottom back section, the top sections of the front and back sections being constructed of a heat-conducting material, and the bottom sections of the front and back sections being constructed of a heat-insulating material.

21. The computer of claim 16 wherein a heat sink is located in any suitable location on said computer housing except for said bottom section, said heat sink having means to conduct and dissipate heat from an internal portion of said housing to the atmosphere.

22. The computer of claim 16 wherein said computer housing has insulating legs attached to the bottom section, said legs being constructed of a heat-insulating material and when said computer is worn providing an airspace between said bottom section and said user's body.

23. The computer of claim 16 wherein at least one of the following means is used to dissipate heat from an internal portion of said housing:
   a. a heat sink in said housing;
   b. at least portions of said housing constructed of heat-conducting and heat-insulating materials; or
   c. housing legs constructed of heat-insulating materials.

24. The computer of claim 16 wherein said housing comprises an offset peripheral connector recessed from a rear terminal portion or back section of said computer housing, said offset peripheral connectors are adjacent to and recessed back from said back section in such a manner that a rigid connector connected thereto does not extend substantially beyond said back section, said peripheral connector means having a configuration that substantially conforms to the curvature of a user's body.

25. The computer of claim 16 wherein said housing comprises a PC card housing having means to contain substantially an entire PC card when contained therein.

26. The computer of claim 16 wherein said housing comprises a compartment for housing a removable hard drive and an opening in said front section of said computer housing for internal connection to an IrDA transceiver.

27. The computer of claim 16 wherein said top section of said housing comprises mouse control means.

28. The computer of claim 16 wherein said computer has connecting means to a power supply, a keyboard or a monitor.

29. The computer of claim 16 wherein said hands-free activation means is selected from the group consisting of audio activation means, eye-tracking activation means, electroencephalography activation means, head and arm-tracking means and mixtures thereof.

30. The computer of claim 16 wherein said heat-conducting material is magnesium.

31. The computer of claim 16 wherein said heat-insulating material is selected from the group consisting of rubber, plastic, fiberglass or mixtures thereof.

32. The computer of claim 16 wherein said communication means is selected from the group consisting of cellular telephones, hard wire telephones, radio transceivers, infrared, laser, fiber optics and other suitable transceivers.

* * * * *